US012711957B2

(12) United States Patent
Nosrati et al.

(10) Patent No.: US 12,711,957 B2
(45) Date of Patent: Aug. 18, 2026

(54) MULTI-DEVICE, MULTI-CHANNEL ATTENTION FOR SPEECH AND AUDIO ANALYTICS APPLICATIONS

(71) Applicant: Dolby Laboratories Licensing Corporation, San Francisco, CA (US)

(72) Inventors: Hadis Nosrati, Queens Park (AU); Brenton James Potter, Marrickville (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 1 day.

(21) Appl. No.: 18/707,840

(22) PCT Filed: Nov. 9, 2022

(86) PCT No.: PCT/US2022/049464
§ 371 (c)(1),
(2) Date: May 6, 2024

(87) PCT Pub. No.: WO2023/086424
PCT Pub. Date: May 19, 2023

(65) Prior Publication Data

US 2025/0210040 A1 Jun. 26, 2025

Related U.S. Application Data

(60) Provisional application No. 63/374,870, filed on Sep. 7, 2022, provisional application No. 63/277,231, filed on Nov. 9, 2021.

(51) Int. Cl.
*G10L 15/22* (2006.01)
*G10L 15/18* (2013.01)
*G10L 25/30* (2013.01)

(52) U.S. Cl.
CPC .......... *G10L 15/22* (2013.01); *G10L 15/1822* (2013.01); *G10L 25/30* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 9,767,826 | B2 | 9/2017 | Matheja |
| 10,026,399 | B2 | 7/2018 | Gopalan |

(Continued)

FOREIGN PATENT DOCUMENTS

| | | | |
|---|---|---|---|
| CN | 108352157 A * | 7/2018 | ....... G10K 11/17883 |
| CN | 110168570 A * | 8/2019 | ............ G06N 5/022 |

(Continued)

OTHER PUBLICATIONS

Chang, F., et al., "End-to-End multi-channel transformer for speech recognition" , Alexa Machine Learning, Amazon, USA, ICASSP, 2021, p. 5884-5888, 5 pages.

(Continued)

*Primary Examiner* — Quynh H Nguyen

(57) ABSTRACT

Some disclosed methods involve receiving sensor data, including microphone data from each of a plurality of devices in the environment, producing an input embedding vector corresponding to each sensor, producing a device-wise context vector corresponding to each device, obtaining ground truth data and comparing each device-wise context vector with the ground truth data, to produce a comparison result. The comparing may involve an attention-based process. Some disclosed methods involve generating one or more current output analytics tokens based, at least in part, on the comparison result and controlling the operation of at least one device based, at least in part, in the one or more current output analytics tokens. The controlling may involve (Continued)

controlling at least one of a speaker operation or a microphone operation.

13 Claims, 8 Drawing Sheets

(56) References Cited

U.S. PATENT DOCUMENTS

| | | | | |
|---|---|---|---|---|
| 10,546,583 | B2 | 1/2020 | White | |
| 10,685,648 | B2 | 6/2020 | Andersen | |
| 10,685,669 | B1 | 6/2020 | Lan | |
| 10,978,049 | B2 | 4/2021 | Lee | |
| 2018/0047389 | A1 | 2/2018 | Song | |
| 2018/0330589 | A1 | 11/2018 | Horling | |
| 2020/0294496 | A1 | 9/2020 | Hughes | |
| 2020/0312315 | A1 | 10/2020 | Li | |
| 2021/0082453 | A1 | 3/2021 | Guo | |
| 2022/0414381 | A1* | 12/2022 | Gautam | G06V 20/41 |

FOREIGN PATENT DOCUMENTS

| | | | | | |
|---|---|---|---|---|---|
| CN | 118197420 | A | * | 6/2024 | G16B 40/20 |
| WO | 2021021857 | A1 | | 2/2021 | |

OTHER PUBLICATIONS

Haeb-Umbach, R., et al., Speech Processing for Digital Home Assistants: Combining Signal Processing With Deep-Learning Techniques, IEEE Signal Processing Magazine, IEEE, Nov. 2019, vol. 36, No. 6, USA, p. 111-124, 14 pages.

Kong, Y., et al., "Multi-Channel Automatic Speech Recognition Using Deep Complex Unet," 2021 IEEE Spoken Language Technology Workshop (SLT), Shenzhen, China, 2021, pp. 104-110, doi: 10.1109/SLT48900.2021.9383492, 7 pages.

Vaswani, A., et al., "Attention is All You Need", Advances in Neural Information Processing Systems , NIPS 2017, arXiv:1706.03762v7, 12 pages.

* cited by examiner

MULTI-DEVICE, MULTI-CHANNEL ATTENTION FOR SPEECH AND AUDIO ANALYTICS APPLICATIONS

CROSS-REFERENCE TO RELATED APPLICATIONS

This application is a U.S. National Stage application under U.S.C. 371 of International Application No. PCT/US2022/049464, filed on Nov. 9, 2022, which claims priority to U.S. Provisional Application No. 63/374,870, filed Sep. 7, 2022, and U.S. Provisional Application No. 63/277,231, filed Nov. 9, 2021, each of which is incorporated by reference in its entirety.

TECHNICAL FIELD

This disclosure pertains to devices, systems and methods for estimating the reliability of sensor data, such as microphone signals, received from multiple devices in an environment, as well as to devices, systems and methods for using selected sensor data.

BACKGROUND

Methods, devices and systems for selecting and using sensor data are widely deployed. Although existing devices, systems and methods for selecting and using sensor data provide benefits, improved systems and methods would be desirable.

NOTATION AND NOMENCLATURE

Throughout this disclosure, including in the claims, the terms "speaker," "loudspeaker" and "audio reproduction transducer" are used synonymously to denote any sound-emitting transducer (or set of transducers) driven by a single speaker feed. A typical set of headphones includes two speakers. A speaker may be implemented to include multiple transducers (e.g., a woofer and a tweeter), which may be driven by a single, common speaker feed or multiple speaker feeds. In some examples, the speaker signal(s) may undergo different processing in different circuitry branches coupled to the different transducers.

Throughout this disclosure, including in the claims, the expression performing an operation "on" a signal or data (e.g., filtering, scaling, transforming, or applying gain to, the signal or data) is used in a broad sense to denote performing the operation directly on the signal or data, or on a processed version of the signal or data (e.g., on a version of the signal that has undergone preliminary filtering or pre-processing prior to performance of the operation thereon).

Throughout this disclosure including in the claims, the expression "system" is used in a broad sense to denote a device, system, or subsystem. For example, a subsystem that implements a decoder may be referred to as a decoder system, and a system including such a subsystem (e.g., a system that generates X output signals in response to multiple inputs, in which the subsystem generates M of the inputs and the other X-M inputs are received from an external source) may also be referred to as a decoder system.

Throughout this disclosure including in the claims, the term "processor" is used in a broad sense to denote a system or device programmable or otherwise configurable (e.g., with software or firmware) to perform operations on data (e.g., audio, or video or other image data). Examples of processors include a field-programmable gate array (or other configurable integrated circuit or chip set), a digital signal processor programmed and/or otherwise configured to perform pipelined processing on audio or other sound data, a programmable general purpose processor or computer, and a programmable microprocessor chip or chip set.

Throughout this disclosure including in the claims, the term "couples" or "coupled" is used to mean either a direct or indirect connection. Thus, if a first device couples to a second device, that connection may be through a direct connection, or through an indirect connection via other devices and connections.

As used herein, a "smart device" is an electronic device, generally configured for communication with one or more other devices (or networks) via various wireless protocols such as Bluetooth, Zigbee, near-field communication, Wi-Fi, light fidelity (Li-Fi), 3G, 4G, 5G, etc., that can operate to some extent interactively and/or autonomously. Several notable types of smart devices are smartphones, smart cars, smart thermostats, smart doorbells, smart locks, smart refrigerators, phablets and tablets, smartwatches, smart bands, smart key chains and smart audio devices. The term "smart device" may also refer to a device that exhibits some properties of ubiquitous computing, such as artificial intelligence.

Herein, we use the expression "smart audio device" to denote a smart device which is either a single-purpose audio device or a multi-purpose audio device (e.g., an audio device that implements at least some aspects of virtual assistant functionality). A single-purpose audio device is a device (e.g., a television (TV)) including or coupled to at least one microphone (and optionally also including or coupled to at least one speaker and/or at least one camera), and which is designed largely or primarily to achieve a single purpose. For example, although a TV typically can play (and is thought of as being capable of playing) audio from program material, in most instances a modern TV runs some operating system on which applications run locally, including the application of watching television. In this sense, a single-purpose audio device having speaker(s) and microphone(s) is often configured to run a local application and/or service to use the speaker(s) and microphone(s) directly. Some single-purpose audio devices may be configured to group together to achieve playing of audio over a zone or user configured area.

One common type of multi-purpose audio device is a smart audio device, such as a "smart speaker," that implements at least some aspects of virtual assistant functionality, although other aspects of virtual assistant functionality may be implemented by one or more other devices, such as one or more servers with which the multi-purpose audio device is configured for communication. Such a multi-purpose audio device may be referred to herein as a "virtual assistant." A virtual assistant is a device (e.g., a smart speaker or voice assistant integrated device) including or coupled to at least one microphone (and optionally also including or coupled to at least one speaker and/or at least one camera). In some examples, a virtual assistant may provide an ability to utilize multiple devices (distinct from the virtual assistant) for applications that are in a sense cloud-enabled or otherwise not completely implemented in or on the virtual assistant itself. In other words, at least some aspects of virtual assistant functionality, e.g., speech recognition functionality, may be implemented (at least in part) by one or more servers or other devices with which a virtual assistant may communication via a network, such as the Internet. Virtual assistants may sometimes work together, e.g., in a discrete and conditionally defined way. For example, two or more virtual assistants may work together in the sense that one of them, e.g., the one which is most confident that it has heard a wakeword, responds to the wakeword. The connected virtual assistants may, in some implementations, form a sort of constellation, which may be managed by one main application which may be (or implement) a virtual assistant.

Herein, "wakeword" is used in a broad sense to denote any sound (e.g., a word uttered by a human, or some other sound), where a smart audio device is configured to awake in response to detection of ("hearing") the sound (using at least one microphone included in or coupled to the smart audio device, or at least one other microphone). In this context, to "awake" denotes that the device enters a state in which it awaits (in other words, is listening for) a sound command. In some instances, what may be referred to herein as a "wakeword" may include more than one word, e.g., a phrase.

Herein, the expression "wakeword detector" denotes a device configured (or software that includes instructions for configuring a device) to search continuously for alignment between real-time sound (e.g., speech) features and a trained model. Typically, a wakeword event is triggered whenever it is determined by a wakeword detector that the probability that a wakeword has been detected exceeds a predefined threshold. For example, the threshold may be a predetermined threshold which is tuned to give a reasonable compromise between rates of false acceptance and false rejection. Following a wakeword event, a device might enter a state (which may be referred to as an "awakened" state or a state of "attentiveness") in which it listens for a command and passes on a received command to a larger, more computationally-intensive recognizer.

As used herein, the terms "program stream" and "content stream" refer to a collection of one or more audio signals, and in some instances video signals, at least portions of which are meant to be heard together. Examples include a selection of music, a movie soundtrack, a movie, a television program, the audio portion of a television program, a podcast, a live voice call, a synthesized voice response from a smart assistant, etc. In some instances, the content stream may include multiple versions of at least a portion of the audio signals, e.g., the same dialogue in more than one language. In such instances, only one version of the audio data or portion thereof (e.g., a version corresponding to a single language) is intended to be reproduced at one time.

SUMMARY

At least some aspects of the present disclosure may be implemented via one or more methods. In some instances, the method(s) may be implemented, at least in part, by a control system and/or via instructions (e.g., software) stored on one or more non-transitory media. Some such methods may involve receiving, by a control system, sensor data from each of a plurality of sensors in an environment. In some examples, the plurality of sensors may correspond to a plurality of devices in the environment. According to some such examples, the sensor data may include microphone data. The method may involve producing, by the control system, an input embedding vector corresponding to each sensor of the plurality of sensors. In some examples, the method may involve producing, by the control system, a device-wise context vector corresponding to each device of the plurality of devices in the environment, to produce a plurality of device-wise context vectors.

In some examples, the method may involve obtaining, by the control system, ground truth data and comparing, by the control system, each device-wise context vector of the plurality of device-wise context vectors with the ground truth data, to produce a comparison result. According to some examples, the comparing may involve an attention-based process. In some examples, the method may involve generating, by the control system, one or more current output analytics tokens based, at least in part, on the comparison result. According to some examples, the one or more output analytics tokens may be, or may include, one or more prior analytics output tokens corresponding to an active noise cancellation process.

According to some examples, the method may involve controlling, by the control system, the operation of at least one device of the plurality of devices in the environment based, at least in part, in the one or more current output analytics tokens. In some examples, the controlling may involve controlling a loudspeaker operation, a microphone operation, or a combination thereof. According to some examples, the controlling may involve controlling one or more of an automatic speech recognition (ASR) process, an acoustic scene analysis (ASA) process, a talker identification process or a Sound Event Classification (SEC) process.

In some examples, the method may involve obtaining, by the control system, one or more prior analytics output tokens within, or with, the length of a context window. In some such examples, the method may involve generating, by the control system, an output embedding vector corresponding to the one or more prior analytics output tokens. In some such examples, the ground truth data may be, or may include, the one or more prior analytics output tokens.

According to some examples, one or more aspects of the method may be implemented via a trained neural network. In some such examples, the trained neural network may be, or may include, a trained attention-based neural network.

In some examples, producing the device-wise context vector may involve integrating each of a plurality of input embedding vectors corresponding to at least one multi-sensor device. In some such examples, the control system may be configured to implement a multi-channel neural context encoder for integrating each of the plurality of input embedding vectors. In some such examples, the multi-channel neural context encoder may be, or may include, a trained attention-based neural network.

According to some examples, integrating the input embedding vectors may involve producing a plurality of cross-channel context vectors. In some such examples, a cross-channel context vector of a first channel may be based, at least in part, on channel self-context vectors of at least a second channel and a third channel. According to some such examples, the method may involve producing a first channel-wise context vector based, at least in part, on a cross-channel context vector and a channel self-context vector. In some examples, producing the first channel-wise context vector may involve using the channel self-context vector as a query and the cross-channel context vector as key and value inputs. According to some examples, producing the device-wise context vector may involve pooling the plurality of channel-wise context vectors.

In some examples, the comparing may be performed by a multi-device context module that includes one or more attention-based neural networks. According to some such examples, the multi-device context module may be configured to implement at least one of a scaled dot product attention process or a multi-head attention process.

Some or all of the operations, functions and/or methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented via one or more non-transitory media having software stored thereon.

At least some aspects of the present disclosure may be implemented via apparatus. For example, one or more devices (e.g., a system that includes one or more devices) may be capable of performing, at least in part, the methods disclosed herein. In some implementations, an apparatus is, or includes, an audio processing system having an interface system and a control system. The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. The control system may be configured for implementing some or all of the methods disclosed herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION OF EMBODIMENTS

In an environment in which one or more sensors are included in devices at multiple locations, signals captured via sensors of a single device may not completely represent the information needed to make robust decisions or reconstructions of the space. This sensor-based information may be relatively more reliable or relatively less reliable due to various factors, such as noise, distance from the signal of interest to the sensor(s), occlusion and/or inherit characteristics of the device or physical location, such as sensor directionality. Therefore, estimating the reliability of sensor signals captured by the sensors of multiple devices (such as multiple devices located at relatively proximal physical locations to a user) can improve a process, such as a decision-making process, based on sensor data.

In some previously-implemented examples, the reliability of microphone signals has been assumed to correlate with proximity to a source of sound that is desired to be captured, such as a person who is speaking. Such a person may be referred to herein as a "talker." However, as described in more detail below, signals from the closest microphone, or from the closest array of microphones, are not necessarily the most reliable. Moreover, the acoustic (or other) conditions of an environment may vary over time. Therefore, a particular sensor, or sensor array, may provide the most reliable sensor data during one time interval but not during another time interval. In other previously-implemented examples, the reliability of sensor signals has been assumed to correspond with the characteristics of individual sensors or sensor arrays. Higher-quality sensors may, for example, have been pre-assigned a relatively higher reliability weighting than lower-quality sensors.

In some disclosed examples, the power of attention-based neural networks is leveraged to determine the relative reliability of sensor data from multiple devices. Such examples involve a dynamic and data-driven process, so there is no need to have pre-assigned weightings for the data from each device or each sensor to indicate relative trustworthiness, whether such weightings are based on proximity to a sound source of interest or on sensor quality. Such implementations can be advantageous. For example, in the context of determining the reliability of microphone data in an audio environment, such implementations may be advantageous because acoustic conditions may change in an audio environment. In some disclosed examples, selected microphone signals may be used to perform one or more tasks such as wakeword detection, acoustic scene analysis, sentiment analysis, automatic speech recognition (ASR), and sound event classification.

Figure 1A:
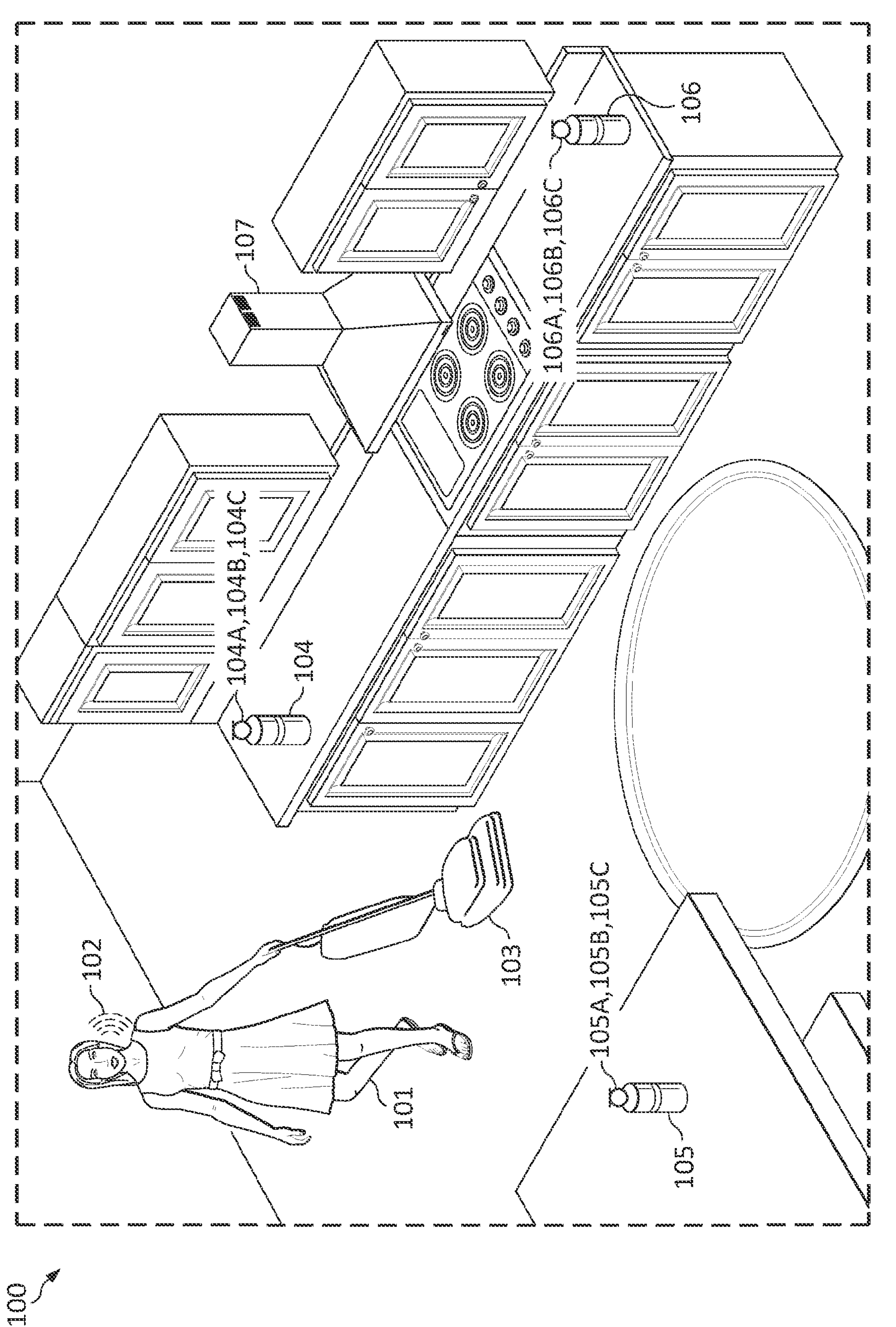
FIG. 1A shows an example of an audio environment.

FIG. 1A shows an example of an audio environment. As with other figures provided herein, the types, numbers and arrangement of elements shown in FIG. 1A are merely provided by way of example. Other implementations may include more, fewer and/or different types, numbers and/or arrangements of elements.

According to this example, the audio environment 100 includes audio devices 104, 105 and 106. In this example, each of the audio devices 104-106 includes an array of microphones. Here, the audio device 104 (which also may be referred to as the "nearby audio device 104") includes microphones 104A, 104B and 104C, the audio device 105 (which also may be referred to as the "mid-distance audio device 105") includes microphones 105A, 105B and 105C, and the audio device 106 (which also may be referred to as the "far-distance audio device 106") includes microphones 106A, 106B and 106C. In some alternative examples, one or more of the audio devices 104-106 may include a single microphone. According to some implementations, two or more of the audio devices 104-106 may include another type of sensor, such as a camera or other optical sensor. According to some examples, each of the audio devices 104-106 may be a smart audio device, such as a smart speaker, and may include one or more loudspeakers. In this example, each of the audio devices 104-106 is configured to listen for a command or wakeword within the audio environment 100.

According to this example, one acoustic event is caused by the talking person 101, who is talking in the vicinity of the audio device 104. Element 102 is intended to represent direct speech of the talking person 130. In some instances, the direct speech may be, or may include, a wakeword. In this example, other acoustic events are caused by the noise source 103, which is a vacuum cleaner in this example, and by the noise source 107, which is a range hood in this example. In part because of the presence of one or more noise sources at varying time intervals, the acoustic conditions of the audio environment 100 may change over time. During some time intervals, such as time intervals during which the vacuum cleaner is powered on and is located between the talker and the nearby audio device 104, the nearby audio device 104 may not provide the most reliable microphone signals corresponding to the direct speech 102. During some such time intervals, either the mid-distance audio device 105 or the far-distance audio device 106 may provide the most reliable microphone signals corresponding to the direct speech 102. Some disclosed examples involve the implementation of dynamic and data-driven methods for determining the reliability of sensor signals, including but not limited to microphone signals.

Figure 1B:
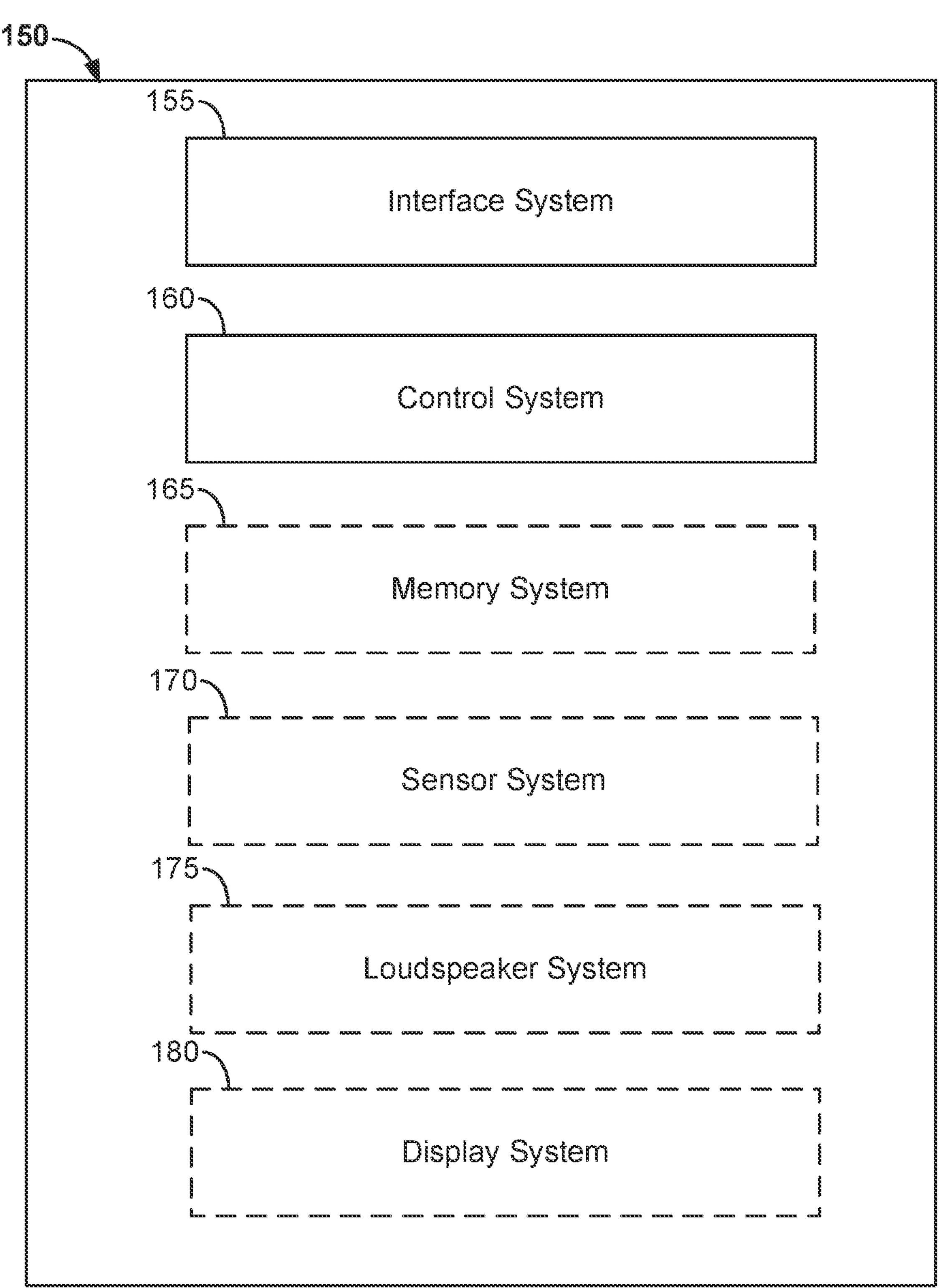
FIG. 1B is a block diagram that shows examples of components of an apparatus capable of implementing various aspects of this disclosure.

FIG. 1B is a block diagram that shows examples of components of an apparatus capable of implementing various aspects of this disclosure. As with other figures provided herein, the types and numbers of elements shown in FIG. 1B are merely provided by way of example. Other implementations may include more, fewer and/or different types and numbers of elements. According to some examples, the apparatus 150 may be configured for performing at least some of the methods disclosed herein. In some implementations, the apparatus 150 may be, or may include, one or more components of an audio system. For example, the apparatus 150 may be an audio device, such as a smart audio device, in some implementations. In other examples, the examples, the apparatus 150 may be a mobile device (such as a cellular telephone), a laptop computer, a tablet device, a television or another type of device.

According to some alternative implementations the apparatus 150 may be, or may include, a server. In some such examples, the apparatus 150 may be, or may include, an encoder. Accordingly, in some instances the apparatus 150 may be a device that is configured for use within an audio environment, such as a home audio environment, whereas in other instances the apparatus 150 may be a device that is configured for use in "the cloud," e.g., a server.

In this example, the apparatus 150 includes an interface system 155 and a control system 160. The interface system 155 may, in some implementations, be configured for communication with one or more other devices of an audio environment. The audio environment may, in some examples, be a home audio environment. In other examples, the audio environment may be another type of environment, such as an office environment, an automobile environment, a train environment, a street or sidewalk environment, a park environment, etc. The interface system 155 may, in some implementations, be configured for exchanging control information and associated data with audio devices of the audio environment. The control information and associated data may, in some examples, pertain to one or more software applications that the apparatus 150 is executing.

The interface system 155 may, in some implementations, be configured for receiving, or for providing, a content stream. The content stream may include audio data. The audio data may include, but may not be limited to, audio signals. In some instances, the audio data may include spatial data, such as channel data and/or spatial metadata. Metadata may, for example, have been provided by what may be referred to herein as an "encoder." In some examples, the content stream may include video data and audio data corresponding to the video data.

The interface system 155 may include one or more network interfaces and/or one or more external device interfaces (such as one or more universal serial bus (USB) interfaces). According to some implementations, the interface system 155 may include one or more wireless interfaces. The interface system 155 may include one or more devices for implementing a user interface, such as one or more microphones, one or more speakers, a display system, a touch sensor system and/or a gesture sensor system. Accordingly, while some such devices are represented separately in FIG. 1B, such devices may, in some examples, correspond with aspects of the interface system 155.

In some examples, the interface system 155 may include one or more interfaces between the control system 160 and a memory system, such as the optional memory system 165 shown in FIG. 1B. However, the control system 160 may include a memory system in some instances. The interface system 155 may, in some implementations, be configured for receiving input from one or more microphones in an environment.

The control system 160 may, for example, include a general purpose single- or multi-chip processor, a digital signal processor (DSP), an application specific integrated circuit (ASIC), a field programmable gate array (FPGA) or other programmable logic device, discrete gate or transistor logic, and/or discrete hardware components.

In some implementations, the control system 160 may reside in more than one device. For example, in some implementations a portion of the control system 160 may reside in a device within one of the environments depicted herein and another portion of the control system 160 may reside in a device that is outside the environment, such as a server, a mobile device (e.g., a smartphone or a tablet computer), etc. In other examples, a portion of the control system 160 may reside in a device within one of the environments depicted herein and another portion of the control system 160 may reside in one or more other devices of the environment. For example, control system functionality may be distributed across multiple smart audio devices of an environment, or may be shared by an orchestrating device (such as what may be referred to herein as a smart home hub) and one or more other devices of the environment. In other examples, a portion of the control system 160 may reside in a device that is implementing a cloud-based service, such as a server, and another portion of the control system 160 may reside in another device that is implementing the cloud-based service, such as another server, a memory device, etc. The interface system 155 also may, in some examples, reside in more than one device.

In some implementations, the control system 160 may be configured for performing, at least in part, the methods disclosed herein. According to some examples, the control system 160 may be configured to receive sensor data from each of a plurality of sensors in an environment. The plurality of sensors may correspond to a plurality of devices in the environment. In some examples, the sensor data includes microphone data (also referred to herein as microphone signals) from a microphone system. In some examples, the control system 160 may be configured to produce an input embedding vector corresponding to each sensor of the plurality of sensors. According to some examples, the control system 160 may be configured to produce a plurality of device-wise context vectors, each device-wise context vector corresponding to a device of the plurality of devices in the environment.

In some examples, the control system 160 may be configured to obtain ground truth data. According to some such examples, the control system 160 may be configured to obtain one or more prior analytics output tokens. In some such examples, the ground truth data may correspond to the one or more prior analytics output tokens. In some examples, the control system 160 may be configured to generate an output embedding vector corresponding to the one or more prior analytics output tokens. In some such examples, the ground truth data may correspond to the output embedding vector.

According to some examples, the control system 160 may be configured to compare each device-wise context vector of the plurality of device-wise context vectors with the ground truth data, to produce a comparison result. In some such examples, the comparing may involve an attention-based process.

In some examples, the control system 160 may be configured to generate one or more current output analytics tokens based, at least in part, on the comparison result. According to some examples, the control system 160 may be configured to control the operation of at least one device of the plurality of devices in the environment based, at least in part, on the one or more current output analytics tokens. In some instances, the control system 160 may be configured to control a loudspeaker operation, a microphone operation, or both a loudspeaker operation and a microphone operation. In some examples, the control system 160 may be configured to control an automatic speech recognition (ASR) process, an acoustic scene analysis (ASA) process, a talker identification process, a Sound Event Classification (SEC) process, or any combination thereof.

According to some examples, the control system 160 may be configured to implement a trained neural network. In some such examples, the trained neural network may be, or may include, an attention-based neural network.

Some or all of the methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. The one or more non-transitory media may, for example, reside in the optional memory system 165 shown in FIG. 1B and/or in the control system 160. Accordingly, various innovative aspects of the subject matter described in this disclosure can be implemented in one or more non-transitory media having software stored thereon. The software may, for example, include instructions for controlling at least one device to perform some or all of the methods disclosed herein. The software may, for example, be executable by one or more components of a control system such as the control system 160 of FIG. 1B.

In some implementations, the apparatus 150 may include the optional sensor system 170 shown in FIG. 1B. The optional sensor system 170 may include one or more touch sensors, gesture sensors, motion detectors, etc. According to some implementations, the optional sensor system 170 may include one or more cameras. In some implementations, the cameras may be free-standing cameras. In some examples, one or more cameras of the optional sensor system 170 may reside in a smart audio device, which may be a single purpose audio device or a virtual assistant. In some such examples, one or more cameras of the optional sensor system 170 may reside in a television, a mobile phone or a smart speaker. In some examples, the apparatus 150 may not include a sensor system 170. However, in some such implementations the apparatus 150 may nonetheless be configured to receive sensor data for one or more sensors in an audio environment via the interface system 160.

In some examples, optional sensor system 170 includes an optional microphone system. The optional microphone system may include one or more microphones. According to some examples, the optional microphone system may include an array of microphones. In some examples, the array of microphones may be configured to determine direction of arrival (DOA) and/or time of arrival (TOA) information, e.g., according to instructions from the control system 160. The array of microphones may, in some instances, be configured for receive-side beamforming, e.g., according to instructions from the control system 160. In some implementations, one or more of the microphones may be part of, or associated with, another device, such as a loudspeaker of the loudspeaker system 175, a smart audio device, etc.

In some examples, the apparatus 150 may not include a microphone system. However, in some such implementations the apparatus 150 may nonetheless be configured to receive microphone data for one or more microphones in an audio environment via the interface system 160. In some such implementations, a cloud-based implementation of the apparatus 150 may be configured to receive microphone data, or data corresponding to the microphone data, from one or more microphones in an audio environment via the interface system 160.

According to some implementations, the apparatus 150 may include the optional loudspeaker system 175 shown in FIG. 1B. The optional loudspeaker system 175 may include one or more loudspeakers, which also may be referred to herein as "speakers" or, more generally, as "audio reproduction transducers." In some examples (e.g., cloud-based implementations), the apparatus 150 may not include a loudspeaker system 175.

In some implementations, the apparatus 150 may include the optional display system 180 shown in FIG. 1B. The optional display system 180 may include one or more displays, such as one or more light-emitting diode (LED) displays. In some instances, the optional display system 180 may include one or more organic light-emitting diode (OLED) displays. In some examples, the optional display system 180 may include one or more displays of a smart audio device. In other examples, the optional display system 180 may include a television display, a laptop display, a mobile device display, or another type of display. In some examples wherein the apparatus 150 includes the display system 180, the sensor system 180 may include a touch sensor system and/or a gesture sensor system proximate one or more displays of the display system 180. According to some such implementations, the control system 160 may be configured for controlling the display system 180 to present one or more graphical user interfaces (GUIs).

According to some such examples the apparatus 150 may be, or may include, a smart audio device, such as a smart speaker. In some such implementations the apparatus 150 may be, or may include, a wakeword detector. For example, the apparatus 150 may be configured to implement (at least in part) a virtual assistant.

Figure 2:
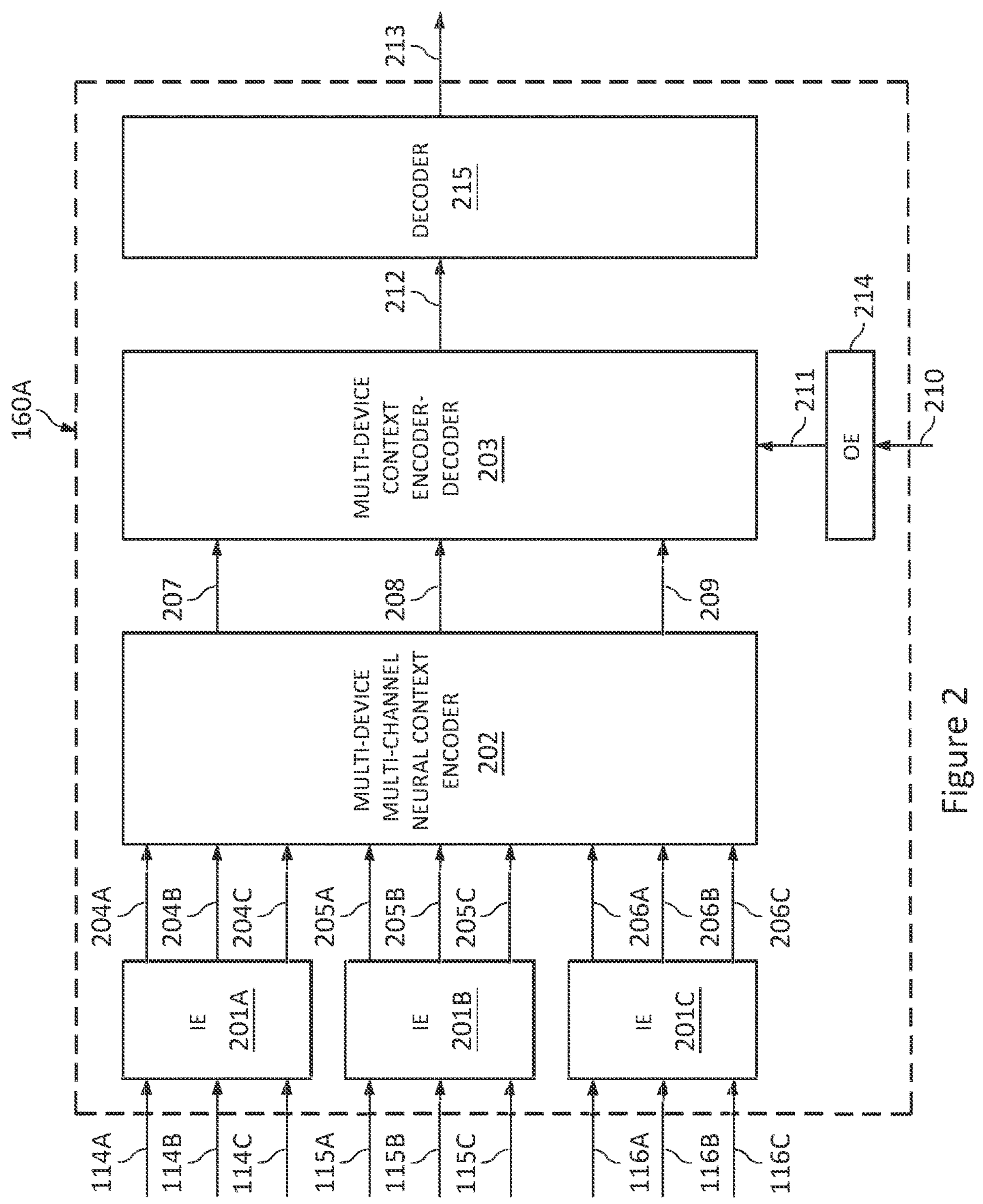
FIG. 2 is a block diagram that represents elements implemented by a control system according to one example.

FIG. 2 is a block diagram that represents elements implemented by a control system according to one example. In this example, the control system 160A is an instance of the control system 160 of FIG. 1B. The control system may, in some instances, be an audio device control system. As with other disclosed implementations, the types, numbers and arrangement of elements in FIG. 2 are merely provided by way of example. Other implementations may include different types, numbers and/or arrangements of elements.

FIG. 2 shows examples of the following elements:

114A, 114B and 114C: input sensor signals, which in this example are microphone signals from microphones 104A, 104B and 104C, respectively, of the audio device 104 of FIG. 1A;

115A, 115B and 115C: input sensor signals, which in this example are microphone signals from microphones 105A, 105B and 105C, respectively, of the audio device 105 of FIG. 1A;

116A, 116B and 116C: input sensor signals, which in this example are microphone signals from microphones 106A, 106B and 106C, respectively, of the audio device 106 of FIG. 1A;

201A: an input embedding (IE) block that is configured to transform the input sensor signals 114A, 114B and 114C into input embedding vectors 204A, 204B and 204C, respectively;

201B: an IE block that is configured to transform the input sensor signals 115A, 115B and 115C into input embedding vectors 205A, 205B and 205C, respectively;

201C: an IE block that is configured to transform the input sensor signals 116A, 116B and 116C into input embedding vectors 206A, 206B and 206C, respectively;

202: a multi-device, multi-channel neural context encoder (MD MC NCE) block that is configured to integrate the input embeddings of multiple channels of sensor data from a device and to produce one context vector per device, which are device-based context vectors 207, 208 and 209 in this example;

203: a multi-device neural context encoder/decoder (MD NC ED) block that is configured to compare the device-based context vectors (in this example, device-based context vectors 207, 208 and 209) with the output token embeddings 211;

204A, 204B and 204C: input embedding vectors corresponding to the input sensor signals 114A, 114B and 114C, respectively;

205A, 205B and 205C: input embedding vectors corresponding to the input sensor signals 115A, 115B and 115C, respectively;

206A, 206B and 206C: input embedding vectors corresponding to the input sensor signals 116A, 116B and 116C, respectively;

207, 208 and 209: The device-wise context vectors corresponding to nearby, mid-distance and far-distance audio devices 104, 105 and 106, respectively;

210: Output tokens;

211: output token embeddings derived by the output embedding (OE) block 214 from the output tokens 210;

212: A context vector corresponding to multiple devices and multiple channels;

213: Output tokens corresponding to a specific speech analytics application;

214: An output embedding (OE) block that converts the output tokens 210 into output token embeddings 211 (which also may be referred to herein as the output embeddings 211 or the context vector 211);

215: A decoder configured to transform the context vector 212 into a sequence of tokens 213 for a particular speech analytics application.

In this example, the input sensor signals 114A-116C may be, or may correspond to, pulse-code modulation (PCM) data or other "raw" microphone signals from the microphones 104A-106C. According to some alternative examples, the input sensor signals 114A-116C may be, or may correspond to, other types of sensor signals. In some alternative examples, one or more of the devices providing input sensor signals may include only a single sensor.

According to this example, the IE blocks 201A-201C are configured to transform the input sensor signals 114A-116C into the input embedding vectors 204A-206C. Embeddings are dense numerical representations of, for example, real-world objects, relationships and/or data, expressed as a vector. An embedding may be thought of as a relatively lower-dimensional space into which relatively higher-dimensional vectors, or relatively more complex data, may be translated. Accordingly, embeddings facilitate machine learning on large and/or complex input datasets. Therefore, the input embedding vectors 204A-206C will generally be less complex than the input sensor signals 114A-116C, but will nonetheless generally include a substantial amount of relevant information regarding the input sensor signals 114A-116C. The IE blocks 201A-201C may be configured to transform the input sensor signals 114A-116C into the input embedding vectors 204A-206C in a variety of ways, depending on the particular implementation. In one example, the input embedding vectors 204A-204C may correspond with the energy in each band of a plurality of frequency bands of the input sensor signals 114A-116C. In some such examples, the IE blocks 201A-201C may be configured to transform the input sensor signals 114A-116C into the input embedding vectors 204A-204C using fixed FFT transformations. However, other implementations may involve more complex transformation methods, such as methods based on neural networks. In some such examples, each of the IE blocks 201A-201C may implement one or more convolutional neural networks (CNNs). In one such example, each CNN may have 7 layers with 512 channels each. Each of the channels may be used to replicate a frequency band or bin. Simpler examples may involve fewer frequency bands, such as 41 frequency bands or 20 frequency bands.

In this example, the MD MC NCE block 202 is configured to integrate the input embeddings of multiple channels of sensor data corresponding to each of the audio devices 104-106 and to produce device-based context vectors 207, 208 and 209.

According to this example, the MD NC ED block 203 is configured to analyze the direct speech signal 102 that is illustrated in FIG. 1A. In the example shown in FIG. 2, the MD NC ED block 203 is configured to compare the device-based context vectors 207, 208 and 209 with the output token embeddings 211, and to output the context vector 212, which corresponds to multiple devices and multiple channels. In this example, the MD NC ED block 203 is configured to implement an attention-based mechanism, so as to attend to the most informative and reliable parts of the context vectors from each device at each time step.

According to this example, the OE block 214 converts the output tokens 210 to the output token embeddings 211. In some examples, the OE block 214 may be configured to implement a positional encoding process, for example if the output embedding model implemented by the OE block 214 is not sequential.

In this example, the sequence of output tokens 210 is within the length of a context window and therefore the output token embeddings 211 are derived from the output tokens 210 over the duration of the context window. The sequence of output tokens 210 and the output token embeddings 211 may be the results of whatever type of analytics the control system 160A is configured to provide. In the context of speech recognition, the output tokens 210 could be, or could correspond to, phonemes or subunits of a transcription. The sequence of output tokens 210 and the output token embeddings 211 also may help to synchronize the sensor data output by various devices (e.g., during a training phase), by synchronizing the device-wise context vectors 207, 208 and 209 with the output token embeddings 211. For example, one device may be significantly farther away than the others, e.g., in another room. The output token embeddings 211 may be used to synchronize the output of the far device with the output of closer devices. The output token embeddings 211 may, in some examples, provide the "ground truth" for a training process.

As noted above, in this example the decoder 215 is configured to transform the context vector 212 into a sequence of output tokens 213 for a particular speech analytics application. For example, if the control system 160A is configured to implement an automatic speech recognition process, the sequence of output tokens 213 may be, or may include, a transcript of the speech. In another example, if the control system 160A is configured to implement wakeword detection process, the sequence of output tokens 213 may be, or may include, a probability (such as a probability ranging from zero to one) that a wakeword has been detected.

Figure 3:
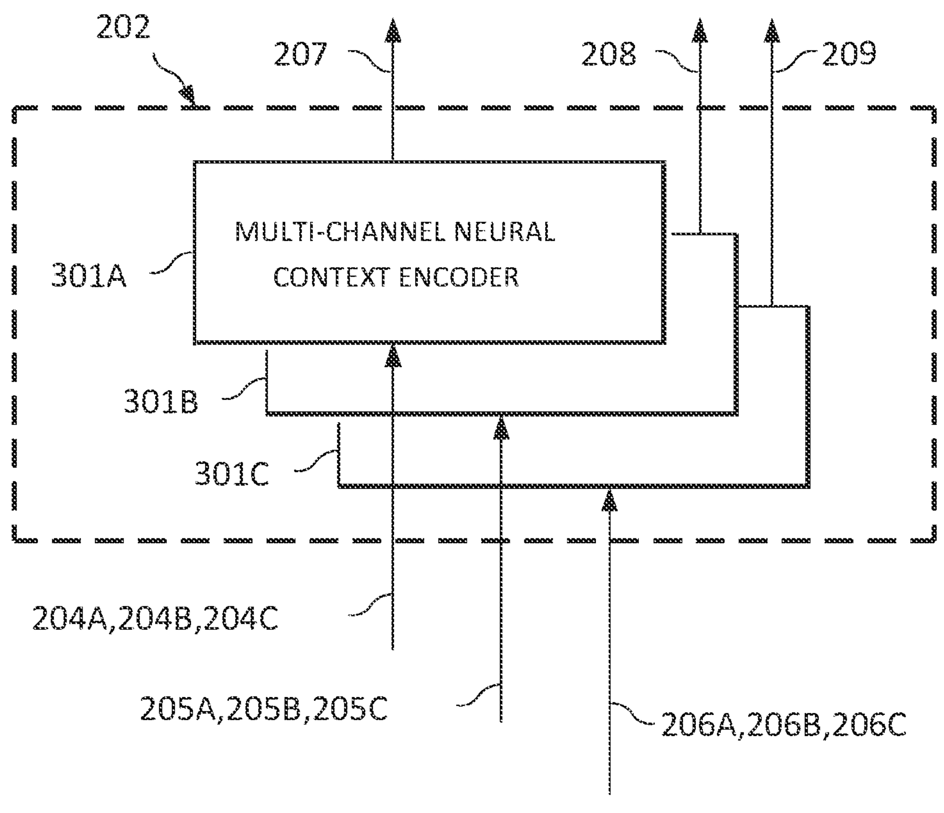
FIG. 3 is a block diagram that shows details of the multi-device, multi-channel neural context encoder (MD MC NCE) block of FIG. 2 according to one example.

FIG. 3 is a block diagram that shows details of the multi-device, multi-channel neural context encoder (MD MC NCE) block of FIG. 2 according to one example. In this example, the elements of FIG. 3 are as follows:

204A, 204B and 204C: Input embedding vectors corresponding to sensor data from device 104;

205A, 205B and 205C: Input embedding vectors corresponding to sensor data from device 105

206A, 206B and 206C: Input embedding vectors corresponding to sensor data from device 106;

207, 208 and 209: The device-wise context vectors corresponding to nearby, mid-distance and far-distance audio devices 104, 105 and 106, respectively, which are the outputs of the multi-channel neural context encoder blocks 301A, 301B and 301C, respectively.

301A, 301B and 301C: Multi-channel neural context encoder blocks configured to produce the device-wise context vectors 207, 208 and 209. Each of the device-wise context vectors 207, 208 and 209 includes embedding information that weights the information of the corresponding input embedding vectors according to which parts of the input information (for example, which channel or channels) are the most reliable, or which are relatively more important for making the context. In some examples, the multi-channel neural context encoder blocks 301A, 301B and 301C may be configured to implement an attention-based process. In some such examples, the multi-channel neural context encoder blocks 301A, 301B and 301C may be configured to calculate an attention probability indicating what level attention should be paid, at each time instant, to each channel of input data. According to some examples, the multi-channel neural context encoder blocks 301A, 301B and 301C may be configured to estimate which parts of the input information are the most reliable, or which are relatively more important, as well as weighted combinations of information observations from multiple channels, based not only on the information from each channel, but also on information that is derived from the inter-channel wise cross channel attention process.

Figure 4:
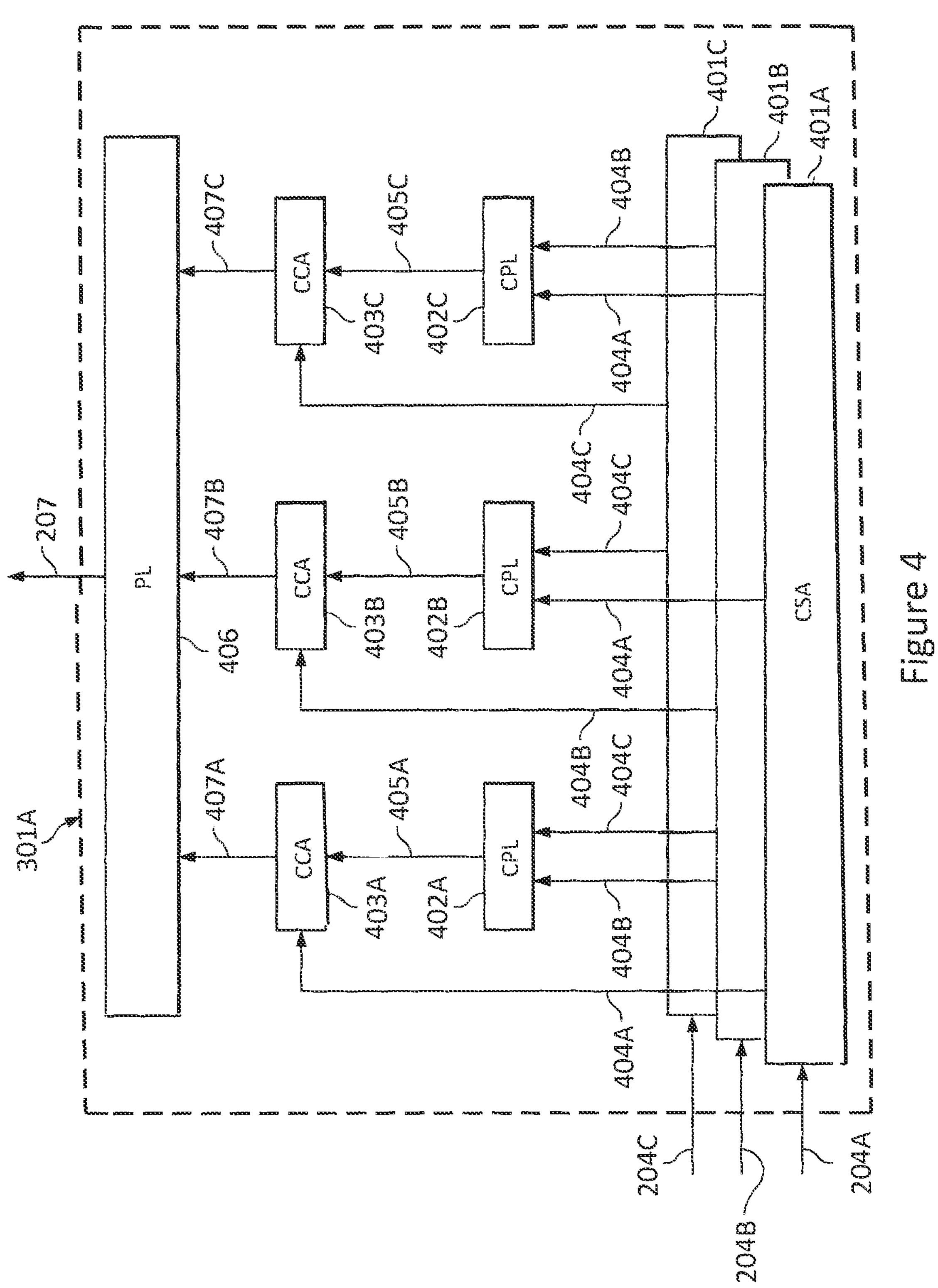
FIG. 4 is a block diagram that shows details of one of the multi-channel neural context encoder blocks of FIG. 3 according to one example.

FIG. 4 is a block diagram that shows details of one of the multi-channel neural context encoder blocks of FIG. 3 according to one example. In this example, the elements of FIG. 4 are as follows:

204A, 204B and 204C: Input embedding vectors corresponding to sensor data from device 104;

401A, 401B and 401C: Channel self-attention (CSA) blocks configured to output channel self-context vectors 404A, 404B and 404C corresponding to the input embedding vectors 204A, 204B and 204C, respectively. Each of the input embedding vectors 204A, 204B and 204C may be referred to herein as belonging to a "channel." The CSA blocks 401A, 401B and 401C may, in some examples, be configured to implement a scaled dot product attention process such as that described below with reference to FIG. 7. In other examples, the CSA blocks 401A, 401B and 401C may be configured to implement a multi-head attention process. A scaled dot product attention process involves a single attention function with a single attention function which may have $d_{model}$-dimensional (in other words, corresponding to the dimensionality of the model) keys, values and queries, whereas in a multi-head attention process the queries, keys and values may be linearly projected h times with different (for example, learned) linear projections to $d_k$, $d_q$ and $d_v$ dimensions, respectively. On each of these projected versions of queries, keys and values, the attention function may be performed in parallel, yielding dr-dimensional output values. These output values may be concatenated and once again projected, resulting in the final values. Relevant scaled dot product attention processes and multi-head attention processes are described in A. Vaswani et al, "Attention Is All You Need," (31st Conference on Neural Information Processing Systems (NIPS 2017)), particularly in Section 3, pages 2-6, which is hereby incorporated by reference;

402A, 402B and 402C: Cross pooling layer (CPL) blocks, which are configured to determine the cross-channel context vectors 405A, 405B and 405C. In this example, the CPL block 402A is configured to determine the cross-channel context vector 405A based on the channel self-context vectors 404B and 404C, the CPL block 402B is configured to determine the cross-channel context vector 405B based on the channel self-context vectors 404A and 404C, and the CPL block 402C is configured to determine the cross-channel context vector 405C based on the channel self-context vectors 404A and 404B. In some examples, the CPL blocks 402A, 402B and 402C are configured to take an average across the channel-wise context vectors, excluding the current channel self-context vector. For example, the CPL block 402A may be configured to determine the cross-channel context vector 405A by taking an average of the channel self-context vectors 404B and 404C;

403A, 403B and 403C: Cross-channel attention (CCA) blocks, which are configured to determine the channel-wise context vectors 407A, 407B and 407C. In this example, the CCA block 403A is configured to determine the channel-wise context vector 407A based on the channel self-context vector 404A and the cross-channel context vector 405A, the CCA block 403B is configured to determine the channel-wise context vector 407B based on the channel self-context vector 404B and the cross-channel context vector 405B, and the CCA block 403C is configured to determine the channel-wise context vector 407C based on the channel self-context vector 404C and the cross-channel context vector 405C. According to some examples, the CCA blocks 403A, 403B and 403C may be configured to implement an attention-based process in which the input is a query. For each query, the CCA blocks 403A, 403B and 403C may be configured to return output, which may be a set of key/value pairs. In some examples, the CCA block 403A may be configured to determine the channel-wise context vector 407A using the channel self-context vector 404A as the query and the cross-channel context vector 405A as the key and value inputs, the CCA block 403B may be configured to determine the channel-wise context vector 407B using the channel self-context vector 404B as the query and the cross-channel context vector 405B as the key and value inputs, and the CCA block 403C may be configured to determine the channel-wise context vector 407C using the channel self-context vector 404C as the query and the cross-channel context vector 405C as the key and value inputs. The CCA blocks 403A, 403B and 403C may, in some examples, be configured to implement a scaled dot product attention process such as that described below with reference to FIG. 7. In other examples, the CCA blocks 403A, 403B and 403C may be configured to implement a multi-head attention process. 404A, 404B and 404C: Channel self-context vectors output by the CSA blocks 401A,

401B and 401C, respectively, and corresponding to the input embedding vectors 204A, 204B and 204C, respectively;

405A, 405B and 405C: cross-channel context vectors output by the CPL blocks 402A, 402B and 402C, respectively;

406: a pooling layer block that is configured to produce the device-wise context vector 207 based on the channel-wise context vectors 407A, 407B and 407C. In some examples, the pooling layer block 406 may be configured to average the channel-wise context vectors 407A, 407B and 407C for each time instance. According to some examples, the pooling layer block 406 may be configured produce a weighted average of the channel-wise context vectors 407A, 407B and 407C. In some such examples, the pooling layer block 406 may be configured to learn weights for averaging the channel-wise context vectors 407A, 407B and 407C using another non-linear activation layer applied to a feed forward layer. In some examples, a linear combination (a weighted sum/affine transform) of the channel-wise context vectors would be enough to "pool" multiple channel observations/vectors to a final observation. However, in some examples, the pooling process may be non-linear, in order to best construct the device-wise context vector. In some examples in which pooling with a affine/linear layer is insufficient, another neural network configuration that is not affine and therefore non-linear may be more suitable and therefore may be implemented.

Figure 5:
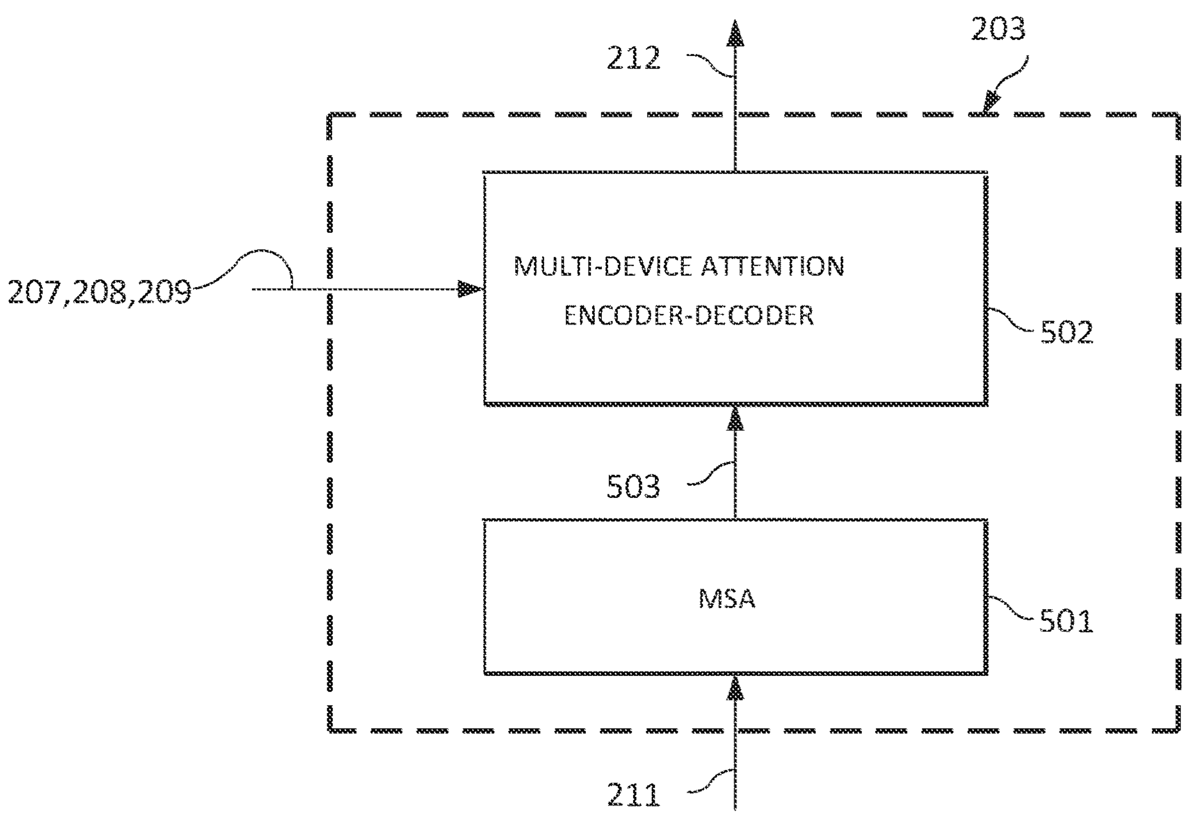
FIG. 5 is a block diagram that shows details of the multi-device neural context encoder/decoder (MD NC ED) block of FIG. 2 according to one example.

FIG. 5 is a block diagram that shows details of the multi-device neural context encoder/decoder (MD NC ED) block of FIG. 2 according to one example. As noted above with reference to FIG. 2, the MD NC ED block 203 is configured to compare the device-based context vectors 207, 208 and 209 with the output token embeddings 211 produced by the output embedding (OE) block 214, and to produce the context vector 212 corresponding to multiple devices and multiple channels.

In this example, the elements of FIG. 5 are as follows:

501: A masked self-attention layer block that is configured to mask the output token embeddings 211 over a time interval (such as a block of T frames) so as to only consider the previously-generated output tokens. Such masking makes the masked self-attention layer block 501 causal. In this example, the masked self-attention layer block 501 is configured to generate a context vector 503 corresponding to the previous output tokens. In some examples, the context vector 503 may be used as a query vector for the multi-device context encoder/decoder block 502;

502: A multi-device context encoder/decoder block that is configured to use the context vector 503 to produce the context vector 212. In some examples, the context vector 503 may be used as a query to find the similarity of output token embeddings 211 versus each of the device-wise context vectors 207, 208 and 209, which correspond to the nearby, mid-distance and far-distance audio devices 104, 105 and 106 in this example. In some such examples, the multi-device context encoder/decoder block 502 may be configured to determine weights for each of the device-wise context vectors 207, 208 and 209 at each time instance based on the reliability of each context vector at a particular time instance. A more detailed explanation of one implementation of the multi-device context encoder/decoder block 502 is provided below with reference to FIG. 6;

503: A context vector corresponding to the output token embeddings 211, which is produced by the masked self-attention layer block 501 and which is provided to the multi-device context encoder/decoder block 502; and

212: A multiple-device and multiple-channel context vector that is produced by the multi-device context encoder/decoder block 502 and is provided to the decoder block 215 (see FIG. 2) in this example.

Figure 6:
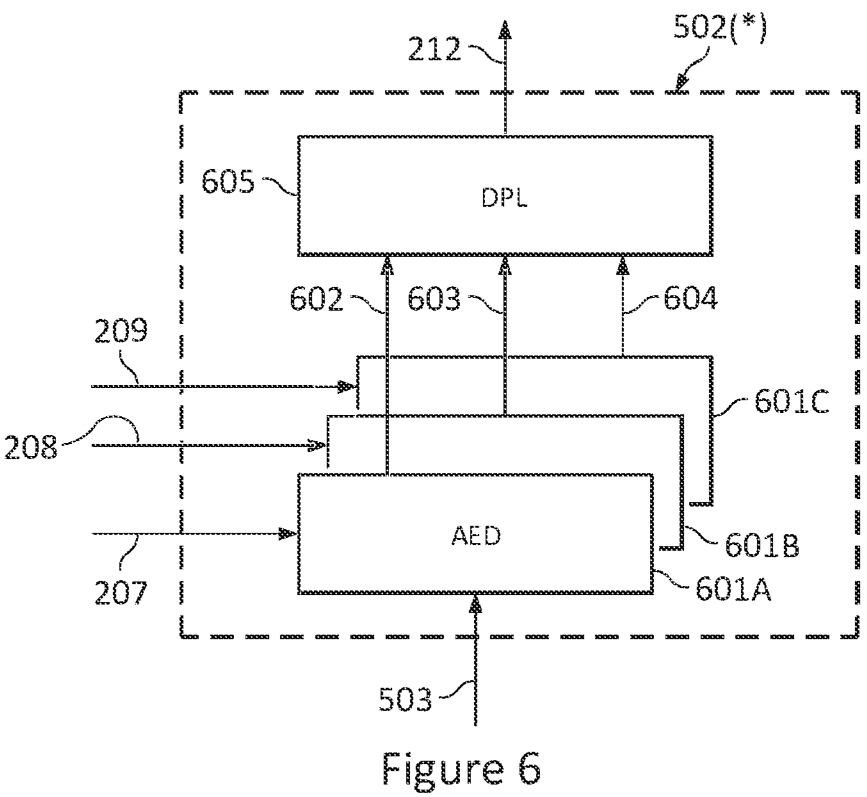
FIG. 6 is a block diagram that shows details of the multi-device context encoder/decoder block of FIG. 5 according to one example.

FIG. 6 is a block diagram that shows details of the multi-device context encoder/decoder block of FIG. 5 according to one example. According to this example, the multi-device context encoder/decoder block 502 includes attention encoder/decoder (AED) blocks 601A, 601B and 601C, and a device pooling layer block 605.

In this example, the AED blocks 601A, 601B and 601C are configured to determine the input-output context vectors 602, 603 and 604 from the device-wise context vectors 207, 208 and 209, respectively. According to some examples, the AED blocks 601A, 601B and 601C may be configured to implement an attention-based process. In some such examples, the AED block 601A may be configured to determine the input-output context vector 602 using the context vector 503 as the query and the device-wise context vector 207 as the key and value, the AED block 601B may be configured to determine the input-output context vector 603 using the context vector 503 as the query and the device-wise context vector 208 as the key and value, and the AED block 601C may be configured to determine the input-output context vector 604 using the context vector 503 as the query and the device-wise context vector 209 as the key and value.

In some examples, the AED blocks 601A, 601B and 601C may be configured to implement a simple scaled dot product attention process, whereas in other examples the AED blocks 601A, 601B and 601C may be configured to implement a multi-head attention process. In some multi-head attention examples, in "encoder/decoder attention" layers, the queries may come from the previous decoder layer output and the keys and values may come from the output of an encoder. Such implementations can allow every position in the decoder to "attend" over all positions in the input sequence. According to some multi-head attention examples, the encoder may contain self-attention layers. In some self-attention layers all of the keys, queries and values may be constructed from the output of the previous layer in an encoder. In some such examples, each position in an encoder may be configured to "attend" to all positions in the previous layer of the encoder.

In this example, the device pooling layer block 605 is configured to determine the context vector 212 based on the input-output context vectors 602, 603 and 604. In some examples, the device pooling layer block 605 may be configured to aggregate the input-output context vectors 602, 603 and 604 across time and across all devices. In some simple examples, the device pooling layer block 605 may be configured to calculate an average across both devices and time instances. According to some examples, the device pooling layer block 605 may be configured to apply a non-linear activation to the aggregated measure (for example, to the average(s)). In some examples, the device pooling layer block 605 may be configured to calculate a weighted average across both devices and time instances. In some such examples, weights applied to calculate the weighted average may be parameters learned during a training process.

Figure 7:
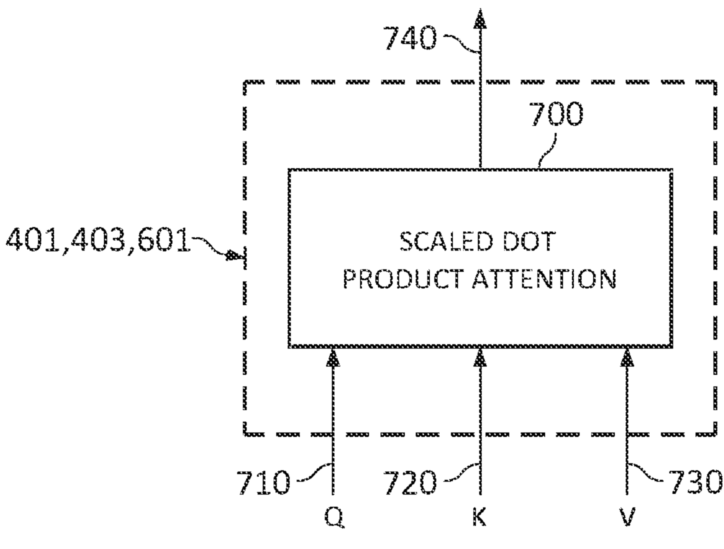
FIG. 7 is a block diagram that illustrates a scaled dot product attention process according to one example.

FIG. 7 is a block diagram that illustrates a scaled dot product attention process according to one example. In this example, the scaled dot product attention (SDPA) block 700 is shown receiving a query 710, a key 720 and a value 730, and producing the output 740. Although the query 710, key 720 and value 730 may be described using the singular form, the query 710 may represent multiple queries, the key 720 may represent multiple keys and the value 730 may represent multiple values.

As suggested by the notation to the left of the SDPA block 700, channel self-attention (CSA) blocks 401A, 401B and 401C, cross-channel attention (CCA) blocks 403A, 403B and 403C and/or attention encoder/decoder (AED) blocks 601A, 601B and 601C can be realized by implementing some version of the SDPA block 700. Generally speaking, each block would use a different set of queries 710, keys 720 and values 730. In some examples, the equivalent inputs and the resulting output of each type of block may be as follows:

- For CSA blocks 401A, 401B and 401C, queries 710, keys 720 and values 730 are all the same, and are equal to the input embedding vectors 204A, 204B and 204C. In other words, if we consider queries 710 to include 710A, 710B and 710C, keys 720 to include 720A, 720B and 720C, and values 730 to include 730A, 730B and 730C, we may say that (710A=720A=730A=204A), (710C=720B=730B=204B) and (710C=720C=730C=204C). In these examples, CSA blocks 401A, 401B and 401C are configured to output channel self-context vectors 404A, 404B and 404C corresponding to the input embedding vectors 204A, 204B and 204C, respectively. Therefore, 740=404A, 404B and 404C. Put another way, if we consider output 740 to include 740A, 740B and 740C. 704A=404A, 704B-404B and 704C=404C.
- For CCA blocks 403A, 403B and 403C, if we consider queries 710 to include 710A. 710B and 710C, we may say that 710A=404A, 710B=404B and 710C=404C. If we consider keys 720 to include 720A, 720B and 720C, and values 730 to include 730A, 730B and 730C, we may say that 720A=730A=the device-wise context vector 207, 720B=730B=the device-wise context vector 208 and 720C=730C=the device-wise context vector 209.
- For AED blocks 601A, 601B and 601C, the queries 710 may correspond to the context vector 503. If we consider the output 740 to include 740A, 740B and 740C, 704A corresponds to the input-output context vector 602, 704B corresponds to the input-output context vector 603 and 704C corresponds to the input-output context vector 604. The other elements may be as follows:
  - For AED block 601A (the processes corresponding to device 104), keys 720 and values 730 correspond to the device-wise context vector 207;
  - For AED block 601B (the processes corresponding to device 105), keys 720 and values 730 correspond to the device-wise context vector 208; and
  - For AED block 601C (the processes corresponding to device 106), keys 720 and values 730 correspond to the device-wise context vector 209.

Figure 8:
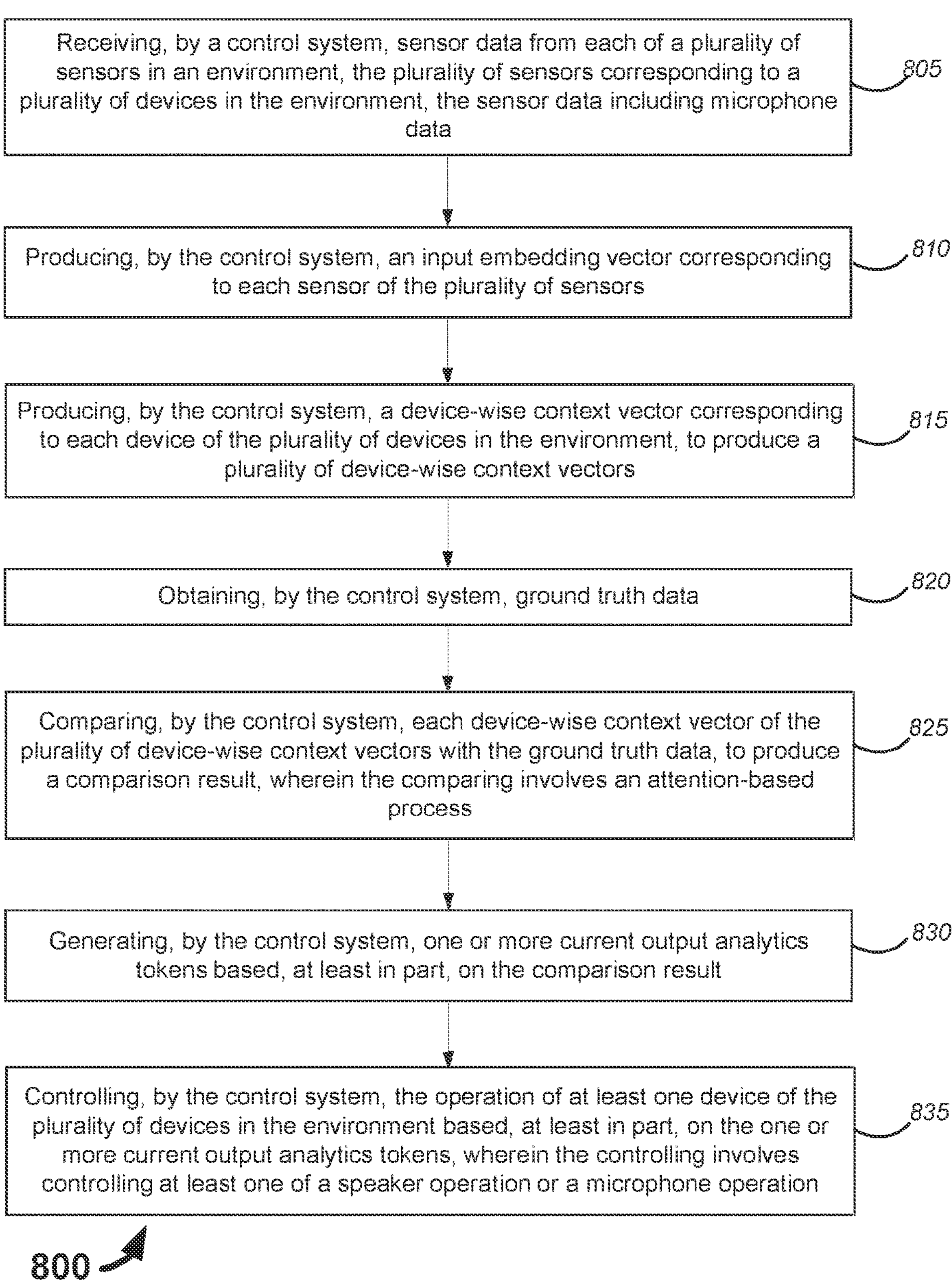
FIG. 8 is a flow diagram that outlines one example of a disclosed method.

FIG. 8 is a flow diagram that outlines one example of a disclosed method. The blocks of method 800, like other methods described herein, are not necessarily performed in the order indicated. Moreover, such methods may include more or fewer blocks than shown and/or described. In this example, method 800 is an audio processing method.

The method 800 may be performed by an apparatus or system, such as the apparatus 150 that is shown in FIG. 1B and described above, one or more of the audio devices 104, 105, or 106, or one or more components thereof, etc. In some such examples, the apparatus 150 includes at least the control system 160 shown in FIG. 1B and described above. In some examples, the blocks of method 800 may be performed by one or more devices within an audio environment, e.g., by an audio system controller (such as what may be referred to herein as a smart home hub) or by another component of an audio system, such as a smart speaker, a television, a television control module, a laptop computer, a mobile device (such as a cellular telephone), etc. In some implementations, the audio environment may include one or more rooms of a home environment. In other examples, the audio environment may be another type of environment, such as an office environment, an automobile environment, a train environment, a street or sidewalk environment, a park environment, etc. However, in alternative implementations at least some blocks of the method 800 may be performed by one or more devices that are configured to implement a cloud-based service, such as one or more servers.

In this example, block 805 involves receiving, by a control system, sensor data from each of a plurality of sensors in an environment. According to some examples, the control system 160 of FIG. 1B may receive sensor data from each of a plurality of sensors of the sensor system 170 in block 805. In this example, the plurality of sensors correspond to a plurality of devices in the environment and the sensor data includes microphone data.

According to this example, block 810 involves producing, by the control system, an input embedding vector corresponding to each sensor of the plurality of sensors. According to some examples, block 810 may be performed by one or more of the an input embedding (IE) blocks 201A, 201B and 201C. For example, in some examples described herein with reference to FIG. 2, block 810 may involve the IE block

201A producing the input embedding vectors 204A, 204B and 204C, the IE block 201B producing the input embedding vectors 205A, 205B and 205C and the IE block 201C producing the input embedding vectors 206A, 206B and 206C.

In this example, block 815 involves producing, by the control system, a device-wise context vector corresponding to each device of the plurality of devices in the environment, to produce a plurality of device-wise context vectors. In the example of FIG. 2, block 815 involves producing, by the multi-device, multi-channel neural context encoder (MD MC NCE) block 202, the device-wise context vectors 207, 208 and 209. In some such examples, the device-wise context vectors 207, 208 and 209 correspond to the nearby, mid-distance and far-distance audio devices 104, 105 and 106 of FIG. 1A. In the example of FIG. 1A, the audio devices 104, 105 and 106 each include multiple sensors (at least three microphones). Accordingly, in some examples, producing the device-wise context vector may involve integrating each of a plurality of input embedding vectors corresponding to at least one multi-sensor device.

According to some examples, the control system may be configured to implement a multi-channel neural context encoder for integrating each of the plurality of input embedding vectors. One such example is the multi-device, multi-channel neural context encoder (MD MC NCE) block 202 disclosed herein. In some examples, the multi-channel neural context encoder may be, or may include, a trained attention-based neural network.

In some examples, integrating the input embedding vectors may involve producing a plurality of cross-channel context vectors. Some disclosed examples include the cross-channel context vectors 405A, 405B and 405C, which are produced by the cross pooling layer (CPL) blocks 402A, 402B and 402C in the example shown in FIG. 4. In some such examples, a cross-channel context vector of a first channel may be based, at least in part, on channel self-context vectors of at least a second channel and a third channel. In the example of FIG. 4, the cross-channel context vector 405A is based on the channel self-context vectors 404B and 404C.

According to some examples, method 800 may involve producing at least a first channel-wise context vector (e.g., at least the channel-wise context vector 407A, 407B or 407C of FIG. 4). In some such examples, the first channel-wise context vector may be based, at least in part, on a cross-channel context vector and a channel self-context vector. For example, the channel-wise context vector 407A of FIG. 4 is based, at least in part, on the cross-channel context vector 405A and the channel self-context vector 404A. In some examples, producing the first channel-wise context vector may involve using the channel self-context vector as a query and the cross-channel context vector as key and value inputs. For example, the channel-wise context vector 407A of FIG. 4 may be determined using the channel self-context vector 404A as the query and the cross-channel context vector 405A as the key and value inputs.

According to some examples, producing the device-wise context vector may involve pooling the plurality of channel-wise context vectors. In the example shown in FIG. 4, the pooling layer 406 produces the device-wise context vector 207 by pooling the channel-wise context vectors 407A, 407B and 407C.

In this example, block 820 involves obtaining, by the control system, ground truth data. According to some examples, the ground truth data may be, may include, or may correspond to, one or more prior analytics output tokens. The one or more prior analytics output tokens may include one or more analytics output tokens corresponding to an automatic speech recognition (ASR) process, an acoustic scene analysis (ASA) process, a talker identification process, a Sound Event Classification (SEC) process, including any acoustic sounds in the environment not covered in an ASR process, or any combination of an echo cancellation process, a noise suppression process, or signal de-reverberation process. In some examples, method 800 may involve obtaining, by the control system, one or more prior analytics output tokens (such as the output tokens 210) within the length of a context window. In some such examples, method 800 may involve generating, by the control system, an output embedding vector (such as the output token embeddings 211 derived by the output embedding (OE) block 214 from the output tokens 210) corresponding to the one or more prior analytics output tokens.

In addition, the control system, according to some examples can be modified with the omission of 214, for example when ground truth analytics output tokens are unavailable and the control system is operating in the presence of an acoustic environment or under controlled simulation where information is expected to be reconstructed at the decoder output 213 in order to satisfy a loss function which minimizes the error between output 213 and a desired signal of which a modified and potentially corrupted version of said desired signal is input into 104-106A/B/C. In an unsupervised sense the absence of ground truth analytics tokens is here made not a requirement for the control system, in order to produce a combination and aggregation over input channels and devices a signal which matches in reconstruction a desired signal featuring any or either of suppressed noise, cancelled echo, reduced reverberation or improved speech-signal to noise ratio. In some such examples, the decoder block 215 may be replaced with a decoder which involves a larger parameter count in order to provide the transformation and reconstruction from context vector 212 into an audio signal which can be compared to a desired audio signal.

According to this example, block 825 involves comparing, by the control system, each device-wise context vector of the plurality of device-wise context vectors with the ground truth data, to produce a comparison result. In this example, the comparing involves an attention-based process. In some examples, the attention-based process may be, or may include, a scaled dot product attention process or a multi-head attention process.

In some examples, the comparing may be performed by a multi-device context module that comprises one or more attention-based neural networks. Multi-device neural context encoder/decoder (MD NC ED) block 203 provides an example of one such multi-device context module. The context vector 212 of FIG. 2 provides one example of a comparison result. In some examples, the multi-device context module may be configured to implement a scaled dot product attention process, a multi-head attention process, or both a scaled dot product attention process and a multi-head attention process.

In this example, block 830 involves generating, by the control system, one or more current output analytics tokens based, at least in part, on the comparison result. In FIG. 2, output tokens 213, which are based on the context vectors 212, are examples of the one or more current output analytics tokens of block 830.

According to this example, block 835 involves controlling, by the control system, the operation of at least one device of the plurality of devices in the environment based, at least in part, in the one or more current output analytics tokens. In this example, the controlling involves controlling at least one of a loudspeaker operation or a microphone operation. In some examples, the controlling may involve controlling one or more of an automatic speech recognition (ASR) process, an acoustic scene analysis (ASA) process, a talker identification process, a Sound Event Classification (SEC) process or a noise cancellation process.

According to some examples, one or more aspects of the method 800 may be implemented via a trained neural network. In some such examples, the trained neural network may be, or may include, a trained attention-based neural network.

The neural network block 510A may be trained via offline training (e.g., prior to deployment by an end user), online training (e.g., during deployment by an end user) or by a combination of both offline training and online training. Various examples of training the neural network block 510A are disclosed herein. One or more cost functions used to optimize the neural network block 510A may be chosen by a person, such as a system designer. The definition of globally optimal is application dependent and chosen by the designer. In some examples, the cost function(s) may be selected to optimize for one or more of the following:

- Minimizing the corruption of any desired signal (such as speech) to be enhanced in a microphone feed;
- Maximizing robustness during or after periods of acoustic disturbances; or
- Any combination of the above.

Additional detailed examples of training the neural network block 510A are described below.

Training Examples

Examples of Training Data

Training data should contain a variety of target and non-target signals so that the control system is best prepared for the range of input signal and noise it will encounter in real world scenarios.

Some examples may involve a subsequent transfer learning process in which the neural network is retrained with one or more cost functions that are selected to further optimize performance given a target audio environment (such as a home environment, an office environment, etc.) and a target application (such as wakeword detection, automatic speech recognition, etc.). The transfer learning process may, for example, involve a combination of new training data (e.g., with noise and echo representative of a target device and/or a target audio environment) and a new cost function such as a cost function based on speech corruption.

In some examples, transfer learning may be performed after a device that includes a trained neural network has been deployed into the target environment and activated (a condition that also may be referred to as being "online"). Many of the cost functions defined above are suitable for unsupervised learning after deployment. Accordingly, some examples may involve updating the neural network coefficients online in order to optimize performance. Such methods may be particularly useful when the target audio environment is significantly different from the audio environment(s) which produced the training data, because the new "real world" data may include data previously unseen by the neural network.

In some examples, the online training may involve supervised training. In some such examples, automatic speech recognition modules may be used to produce labels for user speech segments. Such labels may be used as the "ground truth" for online supervised training.

In some examples, the control system may be further configured to implement post-deployment training of the trained neural network. The post-deployment training may, in some such examples, occur after the apparatus configured for implementing the method has been deployed and activated in an audio environment.

Specific Implementation Examples

In some implementations, the control system may be further configured to implement a subband-domain acoustic echo canceller (AEC). In some such implementations, the filtering scheme may include an echo cancellation process. In some such implementations, the apparatus may include the loudspeaker system.

According to some examples, the control system may be configured to implement a noise compensation module. In some such examples, the filtering scheme may include a noise compensation process. In some examples, the control system may be configured to implement a dereverberation module. In some such examples, the filtering scheme may include a dereverberation process.

In some implementations, the control system may be configured to implement a beam steering module. In some such implementations, the filtering scheme may involve, or may include, a beam steering process. In some such implementations, the beam steering process may be a receive-side beam steering process to be implemented by a microphone system.

According to some examples, the control system may be configured to provide the enhanced microphone signals to an automatic speech recognition module. In some such examples, the control system may be configured to implement the automatic speech recognition module.

In some examples, the control system may be configured to provide the enhanced microphone signals to a telecommunications module. In some such examples, the control system may be configured to implement the telecommunications module.

According to some examples, the apparatus configured for implementing the method may include a square law module configured to generate a plurality of residual power signals based, at least in part, on the microphone signals. In some such examples, the square law module may be configured to generate the plurality of residual power signals based, at least in part, on reference signals corresponding to audio being played back by the apparatus and one or more other devices. According to some examples, the apparatus configured for implementing the method may include a selection block configured to select the enhanced microphone signals based, at least in part, on a minimum residual power signal of the plurality of residual power signals.

Some disclosed examples provide an aggregation system based on one or more neural network-based attention mechanisms. In some such examples, sensors from multiple devices may be used to make a relatively more robust decision, as compared to examples in which a sensor from a single device is used for the basis of the decision. In some instances, sensors from multiple devices may be used to make a relatively more robust decision in the presence of one or more environmental artifacts, such as one or more types of environmental noise. In some such instances (such as the situation shown in FIG. 1, in which the closest audio device to the person talking is even closer to the noise source 103) the information from one or more sensors (such as the microphones 104A-104C of the audio device 104) of the may be incomplete or misleading. In some such examples, a control system may be configured to aggregate the estimation of a pre-processing or conditioning signal processing block, such as a noise suppression block, across multiple devices for a more reliable prediction.

According to some examples, a control system may be configured to make speech analytics decisions based on multiple microphone signals located on multiple audio devices in an audio environment. Such speech analytics decisions may include, but are not limited to, the classification of sounds, talker identification, automatic speech recognition, or combinations thereof.

Some aspects of present disclosure include a system or device configured (e.g., programmed) to perform one or more examples of the disclosed methods, and a tangible computer readable medium (e.g., a disc) which stores code for implementing one or more examples of the disclosed methods or steps thereof. For example, some disclosed systems can be or include a programmable general purpose processor, digital signal processor, or microprocessor, programmed with software or firmware and/or otherwise configured to perform any of a variety of operations on data, including an embodiment of disclosed methods or steps thereof. Such a general purpose processor may be or include a computer system including an input device, a memory, and a processing subsystem that is programmed (and/or otherwise configured) to perform one or more examples of the disclosed methods (or steps thereof) in response to data asserted thereto.

Some embodiments may be implemented as a configurable (e.g., programmable) digital signal processor (DSP) that is configured (e.g., programmed and otherwise configured) to perform required processing on audio signal(s), including performance of one or more examples of the disclosed methods. Alternatively, embodiments of the disclosed systems (or elements thereof) may be implemented as a general purpose processor (e.g., a personal computer (PC) or other computer system or microprocessor, which may include an input device and a memory) which is programmed with software or firmware and/or otherwise configured to perform any of a variety of operations including one or more examples of the disclosed methods. Alternatively, elements of some embodiments of the inventive system are implemented as a general purpose processor or DSP configured (e.g., programmed) to perform one or more examples of the disclosed methods, and the system also includes other elements (e.g., one or more loudspeakers and/or one or more microphones). A general purpose processor configured to perform one or more examples of the disclosed methods may be coupled to an input device (e.g., a mouse and/or a keyboard), a memory, and a display device.

Another aspect of present disclosure is a computer readable medium (for example, a disc or other tangible storage medium) which stores code for performing (e.g., coder executable to perform) one or more examples of the disclosed methods or steps thereof.

While specific embodiments of the present disclosure and applications of the disclosure have been described herein, it will be apparent to those of ordinary skill in the art that many variations on the embodiments and applications described herein are possible without departing from the scope of the disclosure described and claimed herein. It should be understood that while certain forms of the disclosure have been shown and described, the disclosure is not to be limited to the specific embodiments described and shown or the specific methods described.

What is claimed is:

1. A method, comprising:

receiving, by a control system, sensor data from each of a plurality of sensors in an environment, the plurality of sensors corresponding to a plurality of devices in the environment, the sensor data including microphone data;

for each device:

producing, by the control system, input embedding vectors corresponding to the plurality of sensors of the device;

producing, by the control system, a device-wise context vector from the input embedding vectors for the sensors of the device, resulting in a plurality of device-wise context vectors, wherein producing the plurality of device-wise context vectors involves integrating the input embedding vectors to produce a plurality of cross-channel context vectors, wherein a cross-channel context vector of a first channel is based, at least in part, on channel self-context vectors of at least a second channel and a third channel;

inputting, by the control system, the device-wise context vectors into a machine learning model, wherein the machine learning model includes an attention mechanism;

predicting, by the machine learning model, one or more output analytics;

controlling, by the control system, the operation of at least one device of the plurality of devices in the environment based, at least in part, on the one or more output analytics, wherein the controlling involves controlling at least one of a loudspeaker operation or a microphone operation.

2. The method of claim 1, wherein the controlling involves controlling one or more of an automatic speech recognition (ASR) process, an acoustic scene analysis (ASA) process, a talker identification process or a Sound Event Classification (SEC) process.

3. The method of claim 1, further comprising:

obtaining, by the control system, one or more prior analytics output tokens within the length of a context window; and generating, by the control system, an output embedding vector corresponding to the one or more prior analytics output tokens, wherein the ground truth data comprises the one or more prior analytics output tokens.

4. The method of claim 3, wherein the one or more output analytics tokens comprise one or more prior analytics output tokens corresponding to an active noise cancellation process.

5. The method of claim 1, wherein one or more aspects of the method is implemented via a trained neural network.

6. The method of claim 5, wherein the trained neural network comprises a trained attention-based neural network.

7. The method of claim 1, wherein the control system is configured to implement a multi-channel neural context encoder for integrating the plurality of input embedding vectors.

8. The method of claim 7, wherein the multi-channel neural context encoder comprises a trained attention-based neural network.

9. The method of claim 1, further comprising producing a first channel-wise context vector based, at least in part, on a cross-channel context vector and a channel self-context vector.

10. The method of claim 9, wherein producing the first channel-wise context vector involves using the channel self-context vector as a query and the cross-channel context vector as key and value inputs.

11. The method of claim 1, wherein producing the device-wise context vector involves pooling the plurality of channel-wise context vectors.

12. One of more non-transitory media having software stored thereon, the software including instructions for controlling one or more devices to implement the method of claim 1.

13. An apparatus comprising:

a receiver for receiving sensor data from each of a plurality of sensors in an environment, the plurality of sensors corresponding to a plurality of devices in the environment, the sensor data including microphone data;

a control system for:

producing input embedding vectors corresponding to the plurality of sensors;

producing device-wise context vectors corresponding to the plurality of devices in the environment, the device-wise context vectors produced from the input embeddings for sensors of the device, to produce a plurality of device-wise context vectors, wherein producing the plurality of device-wise context vectors involves integrating the input embedding vectors to produce a plurality of cross-channel context vectors, wherein a cross-channel context vector of a first channel is based, at least in part, on channel self-context vectors of at least a second channel and a third channel;

inputting the device-wise context vectors into a machine learning model, wherein the machine learning model includes an attention mechanism;

controlling the operation of at least one device of the plurality of devices in the environment based, at least in part, on one or more output analytics predicted by the machine learning model, wherein the controlling involves controlling at least one of a loudspeaker operation or a microphone operation.

* * * * *